Patented May 6, 1947

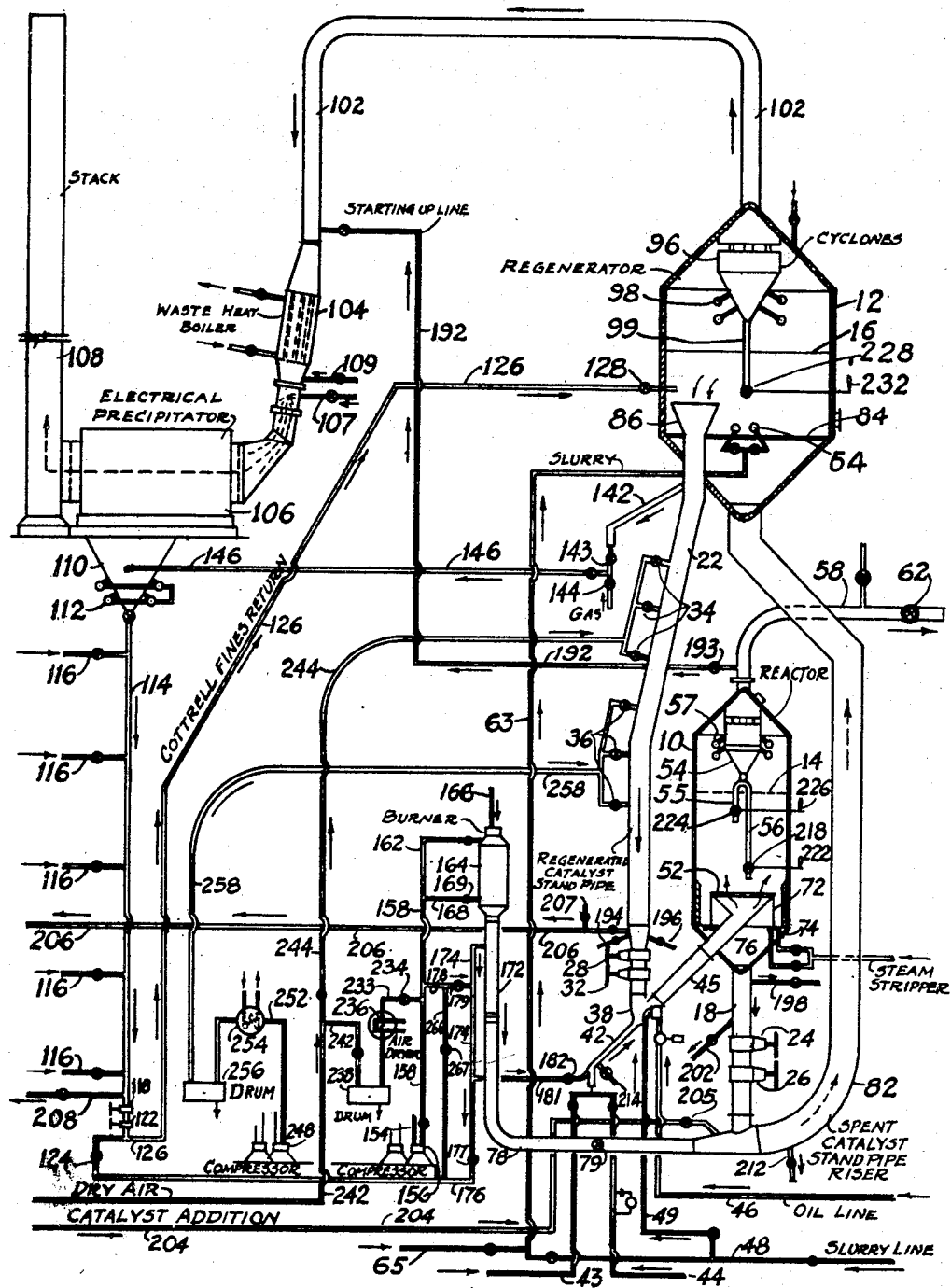

2,420,049

UNITED STATES PATENT OFFICE 2,420,049

CATALYTIC HYDROCARBON CONVERSION STARTING UP PROCEDURE

Homer Z. Martin, Roselle, N. J., assignor to Standard Oil Development Company, a corporation of Delaware Application December 31, 1943, Serial No. 516,338

7 Claims. (Cl. 196—52)

This invention relates to treating hydrocarbon fluids, and more particularly, relates to starting up the operation of a cracking or conversion unit using powdered catalyst.

In the catalytic conversion of hydrocarbons using catalyst, high temperatures are necessary in the reaction zone and in the regeneration zone wherein spent catalyst is regenerated to remove coke or carbonaceous deposits. In starting up the operation of such a process, the whole unit is at atmospheric temperature and it is necessary to bring the whole unit to higher temperatures uniformly so as to avoid distortion and breakage of the parts of the unit due to uneven expansion.

The starting up procedure requires from a part of a day to two days' time to prepare it for the hydrocarbon conversion process. When powdered catalyst is used in such a unit, it is necessary to have the entire unit heated up to a temperature above the condensation point of water to avoid wetting and agglomeration of the powdered catalyst with resultant plugging of the lines.

According to the present invention, an auxiliary burner is used for heating the unit. Hot combustion gases at a temperature of about 1000° F. are passed through the reactor and through the regenerator and associated parts to heat the unit to a temperature above about 250° or 300° F. Then powdered catalyst is added to the combustion gases going to the regenerator and a relatively thin bed of fluidized catalyst is built up in the regenerator. The heating is continued until the temperature is about 600° F. Hot catalyst is passed through the standpipe from the regeneration zone into the reaction zone and a small level of fluidized catalyst is maintained in the reactor. Aeration gas is introduced along the length of the standpipe leading from the regenerator to maintain the catalyst particles in fluidized condition.

Oil is then added to the regeneration zone to heat the catalyst to a temperature of about 700–950° F. More catalyst is added to the system and the level of catalyst in the reactor is raised. When the temperature of the catalyst in the system is about 800–1000° F., liquid hydrocarbon feed at a temperature of about 100–500° F. is introduced into the reactor and the cracking operation is started.

In the drawing, the figure represents one form of apparatus which may be used in carrying out this invention.

Referring now to the drawing, the reference character 10 designates a reaction zone and the reference character 12 designates a regeneration zone. The parts of the apparatus will first be described briefly in connection with the operation of the unit during catalytic conversion of hydrocarbons in order to briefly describe all of the parts of the apparatus. Then the starting up procedure will be set forth in greater detail.

In normal operation, the reaction zone 10 contains a mass of fluidized catalyst particles having a level designated 14. The regeneration zone 12 contains a mass of fluidized powdered catalyst undergoing regeneration and the mass has a level indicated at 16.

Extending from the bottom of the reaction vessel 10 is a standpipe 18. Extending from the bottom portion of the fluidized catalyst in the regeneration zone is a standpipe 22 for carrying the regenerated catalyst particles from the regeneration zone to the reaction zone 10.

Standpipe 18 has a shut-off valve 24 and a slide control valve 26 at its lower portion. The regenerated catalyst standpipe 22 has a shut-off valve 28 and a control slide valve 32 in the lower portion thereof. The regenerated catalyst standpipe 22 has upper aeration taps 34 and lower aeration taps 36.

The hot regenerated catalyst leaving the regenerated catalyst standpipe 22 is introduced into chamber 38 into which gaseous fluid is introduced through line 42. Steam from line 43 and hydrocarbon gas from line 44 are introduced into the line 42. The hot regenerated catalyst is mixed with preheated liquid feed introduced into line 45 through line 46. Line 45 communicates with chamber 38. The liquid hydrocarbon is vaporized and raised to cracking temperature by the powdered catalyst. Oil slurry containing catalyst, which slurry is recovered from the bottom of the fractionator, may be passed through lines 48 and 49 and introduced into line 45 with the fresh feed.

The vaporized oil and powdered catalyst in suspension are passed through line 45 and grid member 52 in the lower portion of the reaction zone 10. In the design of the unit, the operating velocity of the vapors passing upwardly through the mass of fluidized catalyst is selected to be less than 1.6 to 1.5 feet/second to minimize entrainment of catalyst particles from the dense mass of catalyst in the vessel known as the "dense bed." The velocity is preferably above one-half foot per second to provide for good mixing and agitation in the "dense bed."

The reaction products in vapor form leave the mass of catalyst and contain entrained catalyst particles. A large part of these entrained particles are removed by passing the vaporous reaction products through cyclone separators 54 arranged in the upper portion of the reaction zone above the level of fluidized catalyst 14. The separated solid particles are returned to the bed of catalyst by means of either short dip leg 55 or long dip leg 56. Preferably aerating means 57 are provided for aerating the catalyst particles in the hopper associated with the cyclones 54.

The vaporous products freed of a substantial portion of the entrained catalyst pass upwardly through line 58 and are introduced into a fractionating tower (not shown) for separating desired products from heavier hydrocarbons. The outlet line 58 may be provided with a valve 62 for shutting off the line 58 from the fractionator when the unit is being started up. Instead of valve 62, the flow through outlet line 58 may be stopped by providing a back pressure in line 58.

A part of the slurry oil may be passed through lines 48 and 63 to injector or burner 64 arranged in the bottom portion of the mass of fluidized particles undergoing regeneration in the regeneration zone 12. Torch oil may be used instead of slurry and may be introduced into line 63 through line 65.

The grid member 52 has a larger diameter than the pipe 45 but is smaller than the diameter of the reaction vessel 10 to provide a space 72 for stripping spent catalyst particles as they are withdrawn from the bottom portion of the reaction zone 10. Perforated pipes 74 are provided at the lower portion of the stripping section 72 as indicated at 74 for introducing a stripping medium, such as steam. The stripped spent catalyst is collected in the bottom of the reaction vessel 10 as a dense fluidized mixture and is fed to the spent catalyst standpipe 18 above described. Preferably the reaction zone is maintained under a back pressure of about 5 to 10 lbs. and this back pressure, together with the hydrostatic pressure developed by the fluidized catalyst mixture in the reaction zone 10 and in the standpipe 18, is sufficient to raise a less dense mixture of spent catalyst and air to the regeneration zone 12 which is located above the reaction zone 10.

Air for regeneration is introduced through line 78 having a valve 79 for admixture with the spent catalyst leaving the bottom of the spent standpipe 18 and the less dense mixture of spent catalyst and air is passed upwardly through the vertical pipe 82 into the lower portion of the regeneration zone 12 below distribution grid 84. The distribution grid 84 in the regenerator and grid member 52 in the reactor function to distribute the catalyst and gas or vapor evenly across the area of each respective zone. Hot regenerated catalyst is withdrawn from the bottom portion of the body of fluidized catalyst by means of the funnel-shaped draw-off member 86 which forms the upper portion of the standpipe 22. The upper portion of the draw-off member 86 extends above the distribution plate member 84.

Air or other regenerating gas is passed upwardly through the body of catalyst in the regeneration zone 12 at a selected velocity to maintain the catalyst particles in a dry fluidized liquid-like condition. Regeneration gases leaving the bed of fluidized catalyst in the regeneration zone 12 contain entrained catalyst particles and the entrained catalyst is for the most part removed by passing the regeneration gases through cyclones 96. The separated catalyst particles are collected in a hopper below the cyclones and aeration lines 98 are provided for introducing aerating gas for maintaining the catalyst particles in fluidized condition in the hopper. The separated catalyst particles are returned to the body of the fluidized catalyst particles undergoing regeneration through dip pipe 99.

The hot regeneration gases, after passing through the cyclones, pass through outlet pipe 102 and heat exchanger 104 for recovering some heat from the hot regeneration gases and also to cool them and to prepare them for the next step in the process. The hot regeneration gases still contain some catalyst and in order to recover this catalyst, the regeneration gases are passed through an electrical precipitator such as a Cottrell precipitator 106. In order to prevent injury to the electrical precipitator and to improve recovery of solids, it is necessary to control the temperature of the regeneration gases. If necessary, water may be injected through line 107 before the gases pass through the precipitator 106 in order to further cool the gases. The regeneration gases are then passed to a flue 108 and out through the atmosphere. Conditioning steam for the Cottrell is added through line 109.

The catalyst particles recovered in the precipitator 106 are collected in one or more hoppers 110 provided with aerating means 112. The hopper or hoppers discharge into the upper portion of a standpipe 114 for receiving the recovered fine catalyst particles. Aeration lines 116 are provided for standpipe 114. The lower portion of the standpipe is provided with a shut-off valve 118 and a control slide valve 122. Air or other gas is passed through line 124 to pick up the catalyst discharged from the bottom of the standpipe 114 and this mixture is returned through line 126 to the mass of catalyst particles undergoing regeneration in the regeneration zone 12. Line 126 is provided with a valve 128.

The extremely fine particles separated in the precipitator 106 are extremely hard to fluidize and also build up less hydrostatic pressure in fluidized condition than coarser catalyst particles. In order to facilitate the operation of standpipe 114, coarser catalyst is withdrawn from the upper portion of the regenerated catalyst standpipe 22 through line 142 having valve 143 and is mixed with air or other gas introduced through line 144. This mixture is passed through line 146 into the hopper or hoppers 110 for admixture with the fine particles recovered in the precipitator 106.

For providing air under pressure, one or more air compressors are used. Air is drawn in through line 154 and passed through one or more compressors 156 and the compressed air is passed through line 158. In starting up the unit, the compressed air is passed through line 162 to an auxiliary burner 164 into which a gaseous fuel or other fuel is introduced through line 166. The burning mixture has an exceedingly high temperature and in order to reduce the temperature of the mixture, a branch line 168 having a valve 169 leads from the compressed air line 158 into the lower portion of the auxiliary burner 164. The cooler mixture at a temperature of about 1000° to 1200° F. is passed through line 172 and through line 78 into the upflow pipe 82 to the regenerator.

Another line 174 is provided which branches off from line 172 and this heated gas is passed through line 176 having valve 177 which forms a continuation of line 124 for picking up the catalyst fines from the bottom of the standpipe 114. The heated gas passing through line 174 is mixed with cooler air from line 178 having valve 179. Line 178 branches off line 158. A branch line 181 having a valve 182 branches off from line 174 and communicates with the lower portion of line 42 for introducing hot combustion gases through the grid member 52 and into the reaction zone 10. Cooler gas is passed through lines 176 and 181 than is passed through line 172.

Line 192 having valve 193 is provided for conducting combustion gases from the line 58 leading from the top of reaction zone 10 to the regeneration gas outlet line 102 for conducting these gases away from the reaction zone during starting up procedure. If desired, the line 192 may be omitted and the hot combustion gases passed through the fractionating system and the associated equipment, but preferably the line 192 is used.

A valved vent line 194 is provided at the bottom portion of the regenerated catalyst standpipe 22 above the valve 28. A valved drain line 196 is also provided for the standpipe 22 above valve 28. A valved vent line 198 is provided in the upper portion of the spent catalyst standpipe 18. A valved drain line 202 is provided at the lower end of the standpipe 18 above valve 24.

A catalyst addition line 204 having a valve 205 is provided for introducing catalyst into the lower portion of the vertical pipe 82 for the addition of catalyst particles to the unit during starting up and also to replace catalyst which is lost during the operation of the process. Line 206 communicates with the bottom portion of the regenerated catalyst standpipe 22 for removing catalyst from the system when it is desired to shut down the operation of the conversion operation. To facilitate removal of the catalyst and air or other gas, line 207 is provided for introducing air into the line 206.

A valved vent line 208 is provided for the bottom portion of the standpipe 114 above valve 118. A valved drain line 212 is provided at the lower portion of vertical pipe 82. A valved drain line 214 is provided at the bottom portion of line 42. The valved drain lines are provided for removing accumulated water from the pipes during starting up of the process. As combustion gases are used for heating the equipment, cooling of the combustion gases caused condensation of water therefrom and the water collects in the low places in the system.

The dip pipe 56 in reaction zone 10 has a valve 218 at its lower end which is controlled from the exterior by handle 222. The shorter dip pipe 55 has a valve 224 in its lower end provided with an external handle 226 for operating the valve. The dip pipe 99 in the regeneration zone 12 has a valve 228 in its lower end which is controlled by a handle 232 on the outside of the regenerator 12.

Line 233 branches off of compressed air line 158 and is provided with a control valve 234. This compressed air is passed through a cooler 236 for condensing moisture from the air and the cooled compressed air is passed to a knock out drum 238. The partly dried compressed air is withdrawn from the knock out drum through line 242. A portion of this relatively dry compressed air is used for passing the catalyst air mixture through line 204. The compressed air is under a pressure of about 15 lbs./sq. in. gauge. Another portion of this compressed relatively dry air is passed through line 244 and into the upper aeration points 34 for aerating the upper portion of the regenerated catalyst standpipe 22.

A high pressure compressor 248 is used for providing air under a greater pressure. This air is preferably compressed to a pressure of about 45 lbs./sq. in. and the compressed air is passed through line 252 and cooler 254 for condensing some of the moisture from the compressed air. The cooled compressed air is then passed through a knock out drum 256 and the relatively dry compressed air withdrawn through line 258. This air under higher pressure is used for aerating the lower portion of the catalyst in the regenerated catalyst standpipe 22. The dried air under higher pressure is passed through the lower aeration points 36.

Line 266 having valve 267 branches from line 178 ahead of valve 179 and communicates with line 176. During starting up valve 267 is closed and after the unit is started up valve 267 is opened and valve 179 in line 178 is closed so that cold air passes to line 124 and Cottrell standpipe 114.

The starting up procedure will now be described. With the entire unit at atmospheric temperature and with no catalyst present, valve 62 in reactor outlet line 58 is closed and valve 193 in the by-pass line 192 is opened. Or a back pressure is maintained in line 58 to prevent flow of gas from the reactor 10 through line 58. The valves 24 and 26 in the spent catalyst standpipe 18 and valves 28 and 32 in the regenerated catalyst standpipe are closed. The valves 118 and 122 in the Cottrell standpipe 114 are opened. The vent 198 in spent catalyst standpipe 18 and vent 194 in the regenerated catalyst standpipe 22 are opened. Valve 179 in line 178 is opened. Valve 177 in line 176 forming a continuation of line 124 which communicates with the bottom of precipitator standpipe 114 is opened. Valve 79 in line 78 leading to upflow pipe 82 and valve 182 in line 181 leading to inlet pipe 42 for reactor 10 are opened.

Compressor 156 is then started and the auxiliary burner 164 is started by the introduction of a combustible gas thereinto. Secondary air is introduced into the bottom portion of the auxiliary burner 164 through line 168 so that the temperature of the combustion gases leaving the auxiliary burner 164 is about 1000° F. The hot combustion gases are passed through line 172 and line 78 through the vertical pipe 82 and into the regeneration zone 12. From here the combustion gases leave the top of the regeneration zone through line 102 and are passed through the electrical precipitator 106 and out through the outlet or stack 108. Another portion of the hot combustion gases is cooled by mixture with air introduced through line 178 and the mixture is passed through line 181 and open valve 182 into the bottom portion of line 42 which forms a continuation of line 45 for introducing hot combustion gases through grid member 52 into the reaction zone 10. The combustion gases then pass up through the reaction zone and pass from line 58 through by-pass line 192 to the regeneration outlet line 102 and thence to the stack 108. The mixture is also passed from line 174 through line 176 and open valve 177 to the bottom of Cottrell standpipe 114.

With the vents open in the bottom of the standpipes 18 and 22 there will be some passage of combustion gases downward through these standpipes. The amount of hot combustion gases passing to the respective zones 10 and 12 may be regulated by valve 79 in line 78. By closing this valve partially, more of the hot combustion gases will be passed to the reaction zone 10. In order to obtain some flow of hot combustion gases through the stripping section 72 in the reaction zone 10, the valves 24 and 26 at the bottom of the standpipe 18 may be opened slightly. The addition and circulation of the hot combustion gases is continued until the entire unit is at a temperature above about 250° or 300° F. It is important to check the stripping section 72 to be sure that this part of the equipment is heated above about 300° F.

During the heating up of the system the drain valves 196, 202, 212 and 214 are opened at intervals to remove condensed water from the low portions of the system. When the stripping section is above about 300° F., stripping steam may be introduced through aeration means 74.

The 45 lb. air compressor is then started and dry air from this compressor is introduced into the lower portion of the standpipe 22 as above described. The upper part of the standpipe 22 is connected with the low pressure compressor, and air under a lower pressure is introduced into the aeration rings at the upper part of the standpipe 22.

The vent 194 at the bottom of the regenerator catalyst standpipe 22 is then closed. The Cottrell precipitator 106 is then turned on. The precipitator standpipe valves 118 and 122 are closed. The valve 143 in flux line 142 is also closed. The vent 208 at the bottom of the precipitator standpipe 116 is kept open until powder begins to blow out through this vent after catalyst has been added to the system. When the temperature in the Cottrell precipitator reaches about 300° F. conditioning steam is preferably added through line 109 to increase the moisture content of the gases to about 20 mol per cent. Later, when the system becomes hotter, the water sprays at 107 are put into operation to maintain a temperature of not over about 350–400° F. at the inlet of the Cottrell precipitator 106.

The system is now ready for the introduction of catalyst. In feeding catalyst to the system, the catalyst is preferably maintained in large storage hoppers. When it is desired to transfer the powdered catalyst from the hoppers to the system, the catalyst in the hoppers is preferably fluidized by the addition of aerating gas and the powdered catalyst in a gaseous suspension is then passed through line 204 to the bottom of the vertical pipe 82. For fluidizing the catalyst in the hoppers, preferably dry air from line 256 under a pressure of about 45 lbs./sq. in. is used. For conveying catalyst from hoppers to line 82, dry 15# air is used. The addition of catalyst is continued until there is a relatively thin bed of fluidized catalyst in the regeneration zone 12, as, for example, about 5 to 8 ft. deep in the regeneration zone 12 and below the level shown in the drawing. The regenerator is a relatively large vessel and has a height of about 35 ft.

It will be noted that the valves in the regenerated catalyst standpipe 22 are closed so that the catalyst is being added only to the regeneration zone 12. When the catalyst is being added to the system, the temperature of the hot combustion gases leaving the auxiliary burner 164 is raised to about 1200° F. However, the temperature in the line 82 should not be permitted to rise above about 1050° F. Also, the hot combustion gases passing through lines 174 and 176 to the Cottrell standpipe 114 are maintained at about 1000° F. by cooler air added by tertiary line 178 and the hot combustion gases passing through lines 174 and 181 to the reactor 10 are maintained at about 1000° F. by cooler air added by line 178.

During the addition of catalyst and in building up the desired height of catalyst in the regenerator 12, there will be some accumulation of catalyst fines separated from the gases in the electrical precipitator 106 and it may be necessary to remove the catalyst from the standpipe 114. Preferably this is done by fluxing some of the fines with coarser catalyst from line 142 and removing the resulting mixture by dumping and passing it to regenerator 12 through line 126. This may be done at intervals.

When the desired level of catalyst is obtained in the regenerator, the vent 198 in the spent catalyst standpipe 18 and the valves 24 and 26 in the spent catalyst standpipe are closed. Steam is introduced through the oil line 46 and slurry line 49. Also steam is introduced at the base of the regenerated catalyst receiving chamber 38. The flow of air is stopped to line 42 and chamber 38 by closing valve 182.

The catalyst is now introduced into the reactor by opening the regenerated catalyst slide valve 28 and 32 and controlling the rate of flow with the bottom valve 32. The aeration of the regenerated catalyst in the standpipe 22 may be adjusted at this time to obtain the desired pressure build up. It also may be necessary to throttle the reactor outlet by-pass 192 to maintain a pressure above 8 to 10 lbs./sq. in. on the reactor.

When there is a small level of catalyst in the stripping section 72 in the reaction zone 10 and a satisfactory pressure differential exists across the spent catalyst slide valves 24 and 26, the valves 24 and 26 are opened and the rate of flow is controlled by the lower valve 26. The addition of catalyst to the system is continued and a slight build up of level in the reaction zone is permitted. When the level of catalyst rises above the lower end of the dip pipe 56, the valve 218 therein is opened to return catalyst from the hopper 54 to the reaction zone 10. When a satisfactory circulation has been established and a sufficient amount of catalyst is in the system to provide the desired levels, the introduction of catalyst is stopped by closing valve 205.

The heating of the unit is continued by further introduction of hot combustion gases from the auxiliary burner 164. The object of this is to raise the temperature of the regeneration zone and catalyst sufficiently high so that oil firing may be started. When oil firing is started, the unit can be more rapidly heated.

When the catalyst in the unit is at a temperature of about 650° F., torch oil or other oil is introduced at a relatively low rate through injector or burner 64 into the regenerator. The oil is burned in the regenerator and this acts to raise the temperature of the catalyst in the regenerator. The heating should be continued until the temperature of the catalyst in the regenerator is about 700 to 950° F., preferably 700° F.

When the catalyst in the regeneration zone is at a temperature of about 650 to 950 F., the firing rate of the auxiliary burner is reduced. Further catalyst may be added to the unit at this time, if desired. The catalyst addition is then stopped and the catalyst is circulated through the system and the regeneration zone temperature is raised to about 950°–1000° F. When the desired heating is obtained, the temperature in the regenerator may be maintained automatically, if desired, by controlling the flow of torch oil and the auxiliary burner may be shut down at this time.

The flow of hot gas to the precipitator standpipe 114 is discontinued by closing valves 177 and 179 and cold air is passed through line 266 with valve 267 open.

The air going to the aerating means in the hopper 54 in the reaction zone 10 should be replaced by steam. Valve 193 in by-pass line 192 is closed and valve 62 in line 58 is open or back pressure is eliminated to permit vaporous products to pass to the fractionating system. The steam stripping means 74 is put in operation for introducing stripping gas to the stripping section 72 at the bottom portion of reaction vessel 10.

The fresh feed oil preheated to a temperature of about 100 to 400° F. is then introduced through line 46 into the line 45 wherein it is mixed with hot catalyst at a temperature of about 950° F. The catalyst to oil ratio is selected so that the oil is vaporized and raised to a cracking temperature of about 750–1100° F. The full rate of oil feed may or may not be started at once. About 65% to 100% of the total feed is used in the starting up procedure.

Where the catalyst used is fresh and very active, the amount of catalyst maintained in the reactor is low and the steam rate to the reactor is increased to maintain low reaction rate. After the catalyst has been circulated through the system from the reactor to the regenerator and its activity is lower, more catalyst is added to the system and the steam rate to the reactor is cut down. The flow of steam to the reactor is through line 43 and then through lines 42 and 45. Steam from stripping section 72 also flows into the reactor.

Where synthetic silica alumina or silica magnesia, or the like, cracking catalyst is used, steam is used for a part of the starting up procedure and is introduced through line 43. However, the synthetic catalyst is sensitive to steam and the introduction of steam should be cut out as soon as possible, and as soon as compressor gas is collected from the reaction products. The compressor gas is then substituted for the steam and this compressor gas is passed through line 44 into the bottom portion of the line 42 going to the reactor. When freshly prepared catalyst is over active, it may be steamed for a time to reduce its activity.

The regeneration temperature is increased to about 1100° F. and after this temperature is reached, further addition of catalyst to the system may be made, if necessary. At the same time the oil rate to the reactor is increased to the desired value if the total amount has not been reached.

When starting up with very active catalyst, the following steps may be resorted to in order to decrease the extent of cracking:

1. Run at as low catalyst rates as possible, that is, at as high a regenerator temperature and as low a reactor temperature as possible.
2. Adjust the reactor temperature to some reasonably low value, such as 800–900° F.
3. Run at as low a reactor holdup of catalyst as possible.
4. Increase the steam rate to the highest possible value.
5. A feed rate somewhat less than normal is to be desired, depending on the nature of the feed stock, catalyst, and other variables.
6. Charge a special, refractory feed stock.

While specific conditions for starting up have been given, it is to be understood that these are by way of illustration and that changes and modifications may be made without departing from the spirit of the invention.

I claim:

1. In a starting up procedure for catalytic conversion of hydrocarbons in a unit in which a reactor and regenerator and associated equipment are used and powdered catalyst is circulated between the reactor and regenerator, the steps which include burning fuel to produce hot combustion gases and passing such combustion gases through the reactor and regenerator while they are empty to raise the temperature of the reactor and regenerator and associated equipment, removing water condensate from low points in the unit, continuing the introduction of hot combustion gases until the reactor and regenerator and associated equipment are heated to a temperature of about 250° to 300° F. then adding powdered catalyst to the regenerator only and increasing the temperature of the hot combustion gases passing to the regenerator, maintaining the powdered catalyst at a low level in the regenerator as a dry fluidized mass and heating it to a temperature of at least about 600° F., then introducing some of the hot catalyst to the reactor and circulating catalyst from the reactor to the regenerator, adding combustible oil to the powdered catalyst in the regenerator and burning the combustible oil therein to maintain the temperature of the powdered catalyst in the regenerator at about 900° to 950° F., stopping flow of combustion gases to the reactor, adding a part of the oil feed to the reactor and running the unit at the reduced feed rate for a certain period of time, adding further catalyst to the unit and increasing the oil feed rate to the capacity of the unit and continuing the operation at the rate of capacity of the unit.

2. In a starting up procedure for catalytic conversion of hydrocarbons in a unit in which a reactor and regenerator and associated parts are used and during operation powdered catalyst is circulated between the reactor and regenerator, the steps which include burning fuel to produce hot combustion gases and passing such combustion gases through the reactor and regenerator while they are empty to raise the temperature of the reactor and regenerator and associated parts, continuing the introduction of hot combustion gases until the reactor and regenerator and associated parts are heated to a temperature of about 300° F., then adding powdered catalyst to the regenerator only and increasing the temperature of the hot combustion gases passing to the regenerator, maintaining the powdered catalyst at a low level in the regenerator as a dry fluidized mass and heating it to a temperature of about 600° F. to 950° F., then introducing some of the hot catalyst to the reactor, adding combustible oil to the powdered catalyst in the regenerator and burning the combustible oil therein so that the temperature of the powdered catalyst in the regenerator is about 600° F. to 950° F., adding further catalyst to the unit, substituting steam for the combustion gases going to the reactor, adding at least a part of the oil feed to the reactor, substituting air for the hot combustion gases going to the regenerator to burn off carbon from the catalyst in the regenerator and continuing the operation at the rate of capacity of the unit.

3. In a starting up procedure for catalytic conversion of hydrocarbons in a unit in which a reaction zone and regeneration zone are used and powdered catalyst is withdrawn from the bottom of each zone and circulated between the reaction and regeneration zone by means of standpipes, the steps which include burning fuel to produce hot combustion gases and passing such combustion gases as separate streams through the reaction and regeneration zones while they are empty to raise the temperature of the reaction and regeneration zones and associated parts, removing water condensate from low points in the unit, continuing the introduction of hot combustion gases until the reaction and regeneration zones and associated parts are heated to a temperature of about 300° F., then adding powdered catalyst to the regeneration zone only and increasing the temperature of the hot combustion gases passing to the regeneration zone, maintaining the powdered catalyst at a certain level in the regeneration zone as a dry fluidized mass and heating it to a temperature of about 600° F. to 950° F., then introducing some of the hot catalyst to the reaction zone and circulating catalyst from the reaction zone to the regeneration zone, adding combustible oil to the powdered catalyst in the regenerator and burning the oil therein to maintain the temperature of the powdered catalyst in the regenerator at about 600° to 950° F., adding further catalyst to the unit, substituting steam for the combustion gases going to the reaction zone, adding preheated liquid oil feed to the reaction zone for admixture with the hot catalyst whereby the oil is vaporized and converted, substituting air for the hot combustion gases going to the regeneration zone to regenerate the catalyst and continuing the operation at the rate of capacity of the unit.

4. In a starting up procedure for catalytic conversion of hydrocarbons in which a reactor and regenerator are used and powdered catalyst in aerated condition is circulated between the reactor and regenerator by means of standpipes, the steps which include burning fuel to produce hot combustion gases having a temperature of about 1000° F. and passing such combustion gases as two separate streams through the reactor and regenerator while they are empty to raise the temperature of the reactor and regenerator and associated parts, venting gas from the standpipes to heat up the standpipes, continuing the introduction of hot combustion gases until the reactor and regenerator and associated parts are heated to a temperature of about 250° F., then adding powdered catalyst to the regenerator only and increasing the temperature of the hot combustion gases passing to the regenerator to about 1250° F., maintaining the powdered catalyst at a desired level in the regenerator as a fluidized mass and heating it to a temperature of about 900° to 950° F., then introducing some of the hot catalyst to the reactor and circulating catalyst from the reactor to the regenerator, adding combustible oil to the powdered catalyst in the regenerator to maintain the temperature of the powdered catalyst in the regenerator at about 600° F. to 950° F., adding further catalyst to the unit, substituting steam for the combustion gases going to the reactor and substituting air for the combustion gases going to the regenerator, adding preheated liquid oil feed to the reactor for admixture with hot catalyst and increasing the feed rate to the capacity of the unit and continuing the operation at the rate of capacity of the unit.

5. A procedure according to claim 4 wherein dry air is used for aerating the regenerated catalyst standpipe during starting up.

6. In a starting up procedure for catalytic conversion of hydrocarbons in a unit in which a reactor and regenerator and associated parts are used and during operation powdered catalyst is circulated between the reactor and regenerator, the steps which include burning fuel to produce hot combustion gases and passing such combustion gases through the reactor and regenerator while they are empty to raise the temperature of the reactor and regenerator and associated parts, continuing the introduction of hot combustion gases until the reactor and regenerator and associated parts are heated to a temperature of about 250 to 300° F., then adding powdered catalyst to the regenerator only and increasing the temperature of the hot combustion gases passing to the regenerator, maintaining the powdered catalyst at a low level in the regenerator as a dry fluidized mass and supplying heat thereto, then introducing some of the hot catalyst to said reactor and circulating the catalyst between said reactor and regenerator, heating the catalyst to about 650° F., adding combustible oil to the regenerator and burning the oil so that the catalyst in the regenerator is heated, adding the rest of the catalyst to the unit while temperature of the catalyst in the regenerator is below about 700° F., then heating the catalyst in the regenerator to about 950–1000° F., and then adding preheated liquid oil feed to the reactor.

7. A starting-up procedure for an oil conversion process which is executed at elevated temperatures and wherein a reaction is carried out in the presence of a powdered catalyst in a reactor and fouled catalyst is revivified in a regenerator, comprising the steps of first preheating the reactor and regenerator while they are empty to a temperature of about 300° F. by introducing therein hot gases from a burner external to said reactor and regenerator, then adding an amount of powdered catalyst to the regenerator substantially less than the amount normally used in the execution of said process, then further heating the regenerator and the catalyst therein to a temperature of at least 600° F. by continuing the introduction of said hot gases, thereafter passing the heated catalyst to the reactor, again adding catalyst to the regenerator and continuing the heating by the combustion of fuel in the regenerator until the catalyst in the regenerator is at a temperature of about 950–1000° F., and then introducing feed oil into the reactor.

HOMER Z. MARTIN.

REFERENCES CITED

The following references are of record in the file of this patent:

UNITED STATES PATENTS

| Number | Name | Date |
|---|---|---|
| 2,266,033 | Harrison et al. | Dec. 16, 1941 |
| 2,266,095 | Thayer | Dec. 16, 1941 |
| 2,325,516 | Holt et al. | July 27, 1943 |
| 2,327,175 | Conn | Aug. 17, 1943 |
| 2,337,684 | Scheineman | Dec. 28, 1943 |
| 2,330,462 | Weiland | Sept. 28, 1943 |
| 2,339,846 | Eastman et al. | Jan. 25, 1944 |
| 2,361,978 | Swearingen | Nov. 7, 1944 |